United States Patent Office 2,862,314
Patented Dec. 2, 1958

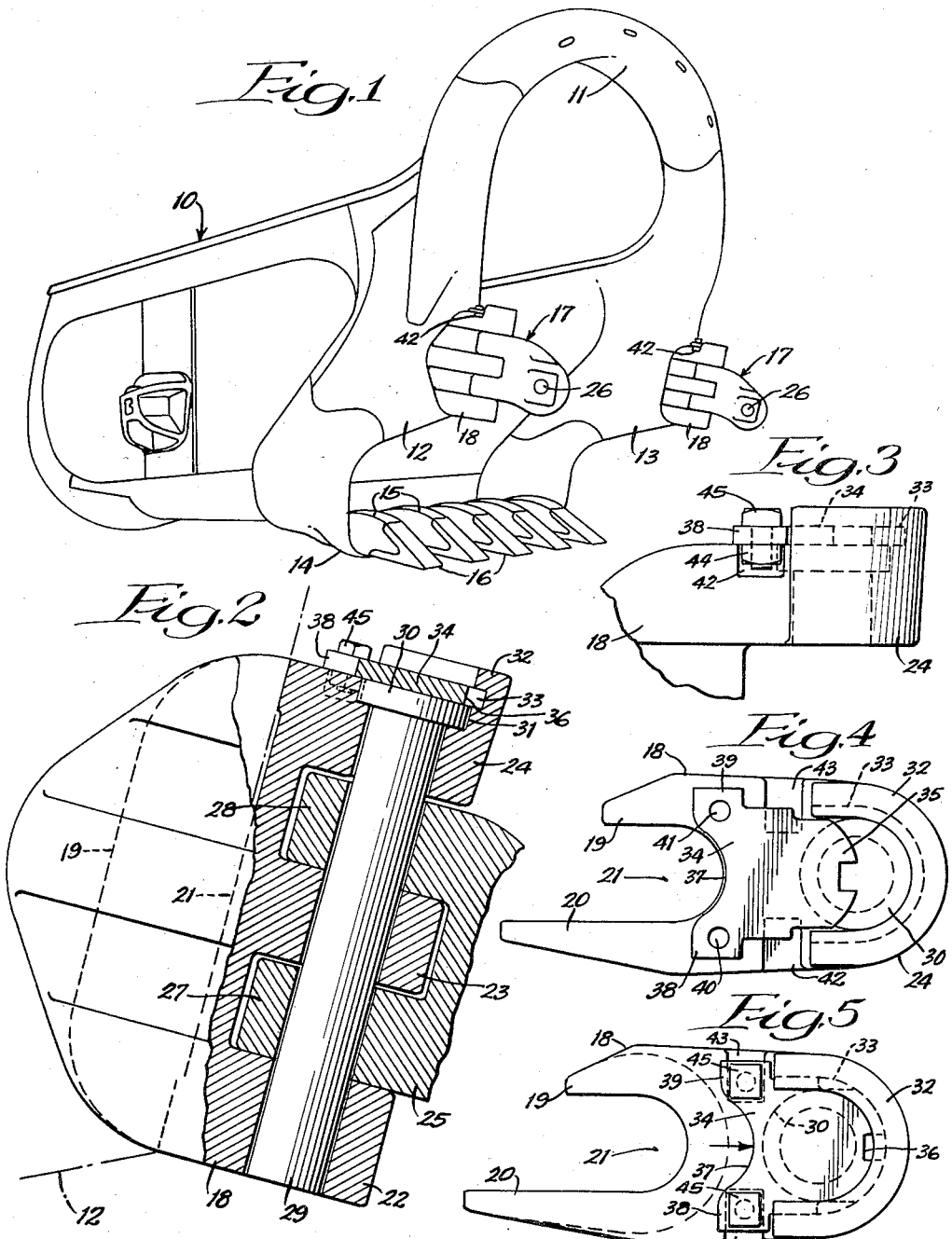

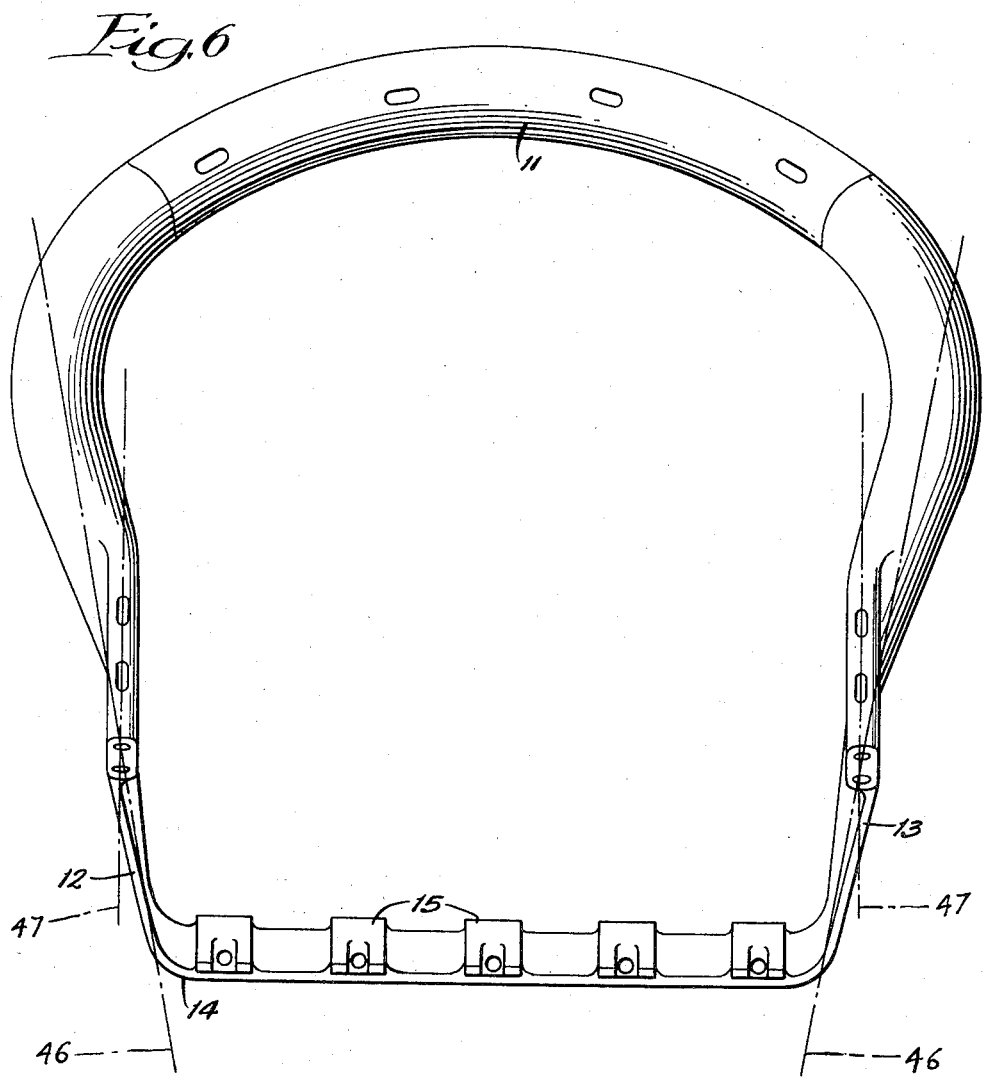

2,862,314

DRAG HITCH ASSEMBLY

Paul V. Larsen, Portland, Oreg., assignor to Electric Steel Foundry Company, Portland, Oreg., a corporation of Oregon Application January 10, 1956, Serial No. 558,338

5 Claims. (Cl. 37—135)

This invention relates to a dragline bucket structure, and is particularly concerned with the drag hitch assembly of such a structure.

In a drag hitch assembly employed in dragline buckets, there is customarily provided a hitch plate that is welded or otherwise rigidly secured to each cheek of the bucket. Pivotally secured to each hitch plate is a clevis or drag hitch extension to which the drag chains for pulling the bucket structure forwardly are secured. The clevis is pivotally connected to the hitch plate by means of a shackle pin, and the pin is locked in place so as to prevent inadvertent or accidental removal thereof during use of the dragline bucket structure. The means employed for locking the shackle pin in place has always been a source of trouble and has presented serious problems in the art. An improved drag hitch assembly with superior means for securing the shackle pin in place has long been needed in the art.

It is, accordingly, an object of this invention to provide such an improved drag hitch assembly. Another object of the invention is that of providing a drag hitch assembly for use with dragline buckets and the like, having an improved means for securing the shackle pin in position through the hitch plate and clevis. Still another object is that of providing a locking means for holding the shackle pin in position that is simple in design, that is easily mounted and removed, and that is functionally superior to those known in the prior art, and is able to readily withstand the great forces exerted thereagainst that result from use of the structure, especially because of the tendency for the shackle pin to move vertically with respect to the hitch plate within the clearance limits between these members.

A further object is that of providing a hitch plate adapted to be rigidly secured to a dragline bucket, and that is equipped with spaced apart fingers or legs pivotally receiving therebetween the spaced legs of a clevis, all of the legs having aligned bores therethrough that receive a shackle pin, the pin being locked against axial movement in one direction by the abutment of the enlarged head thereof with the uppermost leg of the hitch plate, and against axial movement in the opposite direction by a retainer plate that is slidably received within a groove carried by the uppermost leg, the retainer plate being locked in position preferably by a nut and bolt arrangement. Additional objects and advantages will become apparent as the specification is developed.

An embodiment of the invention is illustrated in the accompanying drawing, in which—

Figure 1 is a perspective view of a dragline bucket equipped with a drag hitch assembly embodying the invention; Figure 2 is a broken longitudinal sectional view taken along the vertical axis of the drag hitch assembly; Figure 3 is a broken side view in elevation of the drag hitch assembly; Figure 4 is a top plan view of the drag hitch assembly showing the retainer plate in the process of being moved into position; Figure 5 is a top plan view of the drag hitch assembly when all of the parts thereof are functionally united; and Figure 6 is a front view in elevation of the arch or front end assembly of the bucket shown in Figure 1.

The drag hitch assembly is adapted for use particularly with dragline buckets, and in Figure 1 is shown in position upon a dragline bucket that is designated generally with the numeral 10. For purposes of this invention, the dragline bucket 10 may be wholly conventional, although the one being illustrated is of a particular design embodying a number of improvements that will not be described herein since they do not influence or have an effect on the characteristics of the drag hitch assembly. For purposes of identification, the dragline bucket has an arch 11, cheeks 12 and 13 united with the arch, and a lip 14 equipped with a plurality of spaced apart base members 15 that provide a mounting for the teeth 16.

For purposes of simplifying the drawing, the drag chains, hoist chains, dump block and cable have not been shown. Each of the cheeks 12 and 13 carry a drag hitch assembly 17 to which, as is well known, the drag chains are secured. It should be noted that the side walls (the cheeks 12 and 13 in particular) are angularly oriented with respect to each other and to vertical lines substantially normal to the lip 14. Though the side walls diverge upwardly and outwardly, the drag hitch assemblies, which are about to be described, lie in true vertical planes or along lines substantially normal to the lip 14. The drag hitch assemblies secured to the cheeks 12 and 13 are identical, and a detailed description of one will then apply equally to the other. Such a description will now be set forth.

The assembly 17 includes a top hitch or hitch plate 18 that, as is most apparent from Figures 4 and 5, has a pair of rearwardly extending arms 19 and 20, the latter of which is slightly longer than the former, and these arms define a generally U-shaped recess 21 therebetween dimensioned to fit over the forward edge of the bucket cheeks. When the hitch plate 18 is in position upon the cheeks, it is rigidly secured thereto, preferably by welding, along the meeting surfaces thereof, as is shown most clearly in Figure 1. The hitch plate 18 has extending forwardly therefrom spaced apart fingers or legs, there being three in particular in the illustration given; and for purposes of identification, these are designated with the numerals 22, 23 and 24, the latter being the top or uppermost leg. Each of the legs has a bore extending transversely therethrough, and these bores are in axial alignment, as is clear from Figure 2.

The drag hitch assembly also includes a clevis or drag hitch extension designated with the numeral 25. The extension has a forward and downward projection provided with an opening 26 therethrough that provides a means for securing a drag chain to the clevis. Extending rearwardly, the clevis is equipped with a pair of spaced apart legs 27 and 28 that are received, respectively within the spaces defined between the legs 22 and 23, and 23 and 24 of the hitch plate. The legs 27 and 28 are each provided with a bore therethrough, these bores being in axial alignment, and being adapted to be aligned axially with the bores through the spaced legs of the hitch plate when the clevis is in the position shown most clearly in Figure 2.

The clevis is pivotal with respect to the hitch plate, and the pivotal axis thereof constitutes the longitudinal axis of a shackle pin 29 that extends through all of the aligned bores, thereby securing the hitch plate and clevis together. At its upper end the elongated shackle pin 29 is equipped with an enlarged head 30 that bears downwardly against the bottom wall of a recess 31 provided in the uppermost leg 24 that is dimensioned to readily receive the enlarged head 30 therein. It is clear that axial movement of the pin 29 in a downward direction is constrained by the abutment of the head 30 with the recessed surface of the leg 24.

The leg 24 along the top surface thereof is equipped with an upwardly extending arcuate wall 32 that is substantially semi-circular, as is apparent from Figures 4 and 5. The wall 32 has an arcuate channel 33 formed therein that conforms to the configuration of the wall and is adjacent the lower extremity of the wall 32—that is to say, the lower edge of the channel is substantially in alignment with the upper surface of the head 30 of the shackle pin when the head is in position within the recess 31.

Slidably receivable within the channel 33 is a retainer plate 34. The plate 34 has an arcuate forward end portion 35 that conforms to the size and shape of the channel 33 so that it may be extended thereinto, as shown in Figure 5. Centrally, the arcuate forward end 35 has a notch or recess 36 therein that has a depth such that the inner wall thereof is positioned laterally of the arcuate vertical wall 32 of the leg 24, as is apparent from an inspection of Figure 5. This recess permits the insertion of a tool thereinto so that the plate 34 may be pried laterally to remove it when it is desired to disassemble the drag hitch.

Along its rear edge, the plate 34 is cut away (as shown at 37), the curvature thereof corresponding to the curvature of the recess 21 defined between the legs 19 and 20 of the hitch plate 18. This is apparent from Figure 4. The arcuate recess 37 is provided so that the plate 34 may be placed (as shown in Figure 4) in the mounting thereof without being obstructed by the cheek of a dragline bucket after the hitch plate has been rigidly secured thereto. Adjacent the arcuate recess 37, the retainer plate is equipped with laterally extending ears 38 and 39 that are provided, respectively, with an opening or aperture 40 and 41 therethrough.

The uppermost leg 24 of the hitch plate is provided along each side thereof adjacent the recess 31 with grooves 42 and 43 that are cut inwardly from the side walls and that are adapted to have the ears 38 and 39 and apertures 40 and 41 aligned respectively therewith, when the retainer plate is in position, as is shown in Figures 3 and 5. The grooves are adapted to slidably receive therein a nut 44, and the dimensional relationship between the nut and groove is such that the nut cannot rotate when within the groove. The nut threadedly receives a bolt 45 that may be passed freely through the apertures 40 and 41 in the retainer plate. The head of the bolt 45 abuts the top surface of the retainer plate while the nut 44 is drawn tightly against the under-surface thereof. As shown in Figure 5, the nut 44 and bolt 45 are provided along each side of the plate 34.

In assembly of the structure and use thereof, the hitch plates 18 are mounted upon the cheeks 12 and 13 of a dragline bucket in a rigid manner. Thereafter, the clevis has its legs 27 and 28 interpositioned between the legs of the hitch plate, and when all of the bores are aligned the shackle pin is slid therethrough. Thereafter, the retainer plate 34 is initially positioned as shown in Figure 4, and then moved forwardly and into position within the recess 33 in the riser wall 32. The nuts 44 are moved into the grooves 42 and 43, are aligned with the apertures 40 and 41 while the bolts 45 are threaded into the nuts.

Axial movement of the shackle pin 29 in a downward direction is prevented by engagement of the head 30 therewith with a wall portion of the uppermost leg 24. Axial movement in an upward direction is prevented by a retainer plate 34 which is in substantial abutment with the upper surface of the head 30. It is clear that the retainer plate is unable to move vertically because of the inter-engagement thereof with the walls of the annular channel 33 provided by the riser wall 32. This same channel constrains movement of the retainer plate in all transverse directions except rearwardly, and rearward movement thereof is prevented because the nuts 44 are rigidly secured to the retainer plate and, in turn, are confined within the grooves 42 and 43.

Whenever it is desired to disassemble the structure, the bolts 45 are removed and, if necessary, a pry bar may be slipped into the notch 36, and using the wall 32 as a fulcrum the retainer plate may be driven rearwardly and out of the channel 33. Then the shackle pin 29 is freed and it may be driven upwardly through the bores in the legs of the clevis and legs of the hitch plate.

Dragline buckets are extremely large structures, and while capacities vary considerably, they may range upwards of thirty-five cubic yards. A considerable force must be exerted against the bucket to drag it through a quantity of earth or other material sufficient to fill it to near capacity, while the teeth 16 are digging into the material. This entire force is exerted on the bucket through the drag hitch assembly, or more particularly through the clevis 25, shackle pin 29 and hitch plate 18. The drag chains impart an upward force to the clevis 25, and the clevis is free then to move within the clearance limits afforded between the interpositioned legs 27 and 28 of the clevis and legs 23 and 24 of the hitch plate. Such upward movement is translated to the shackle pin 29, and the pin then has an upward force bearing thereagainst of quite substantial magnitude. The retainer plate and the positioning and locking arrangement therefor that has been described, combine to effectively resist this upward force, and have been found to eliminate the source of trouble present in prior art structures and that arise because of such forces. Yet, the retainer plate is mountable and removable with relative ease and facility.

As has been brought out before, the side walls of the bucket 10 are angled with respect to each other, and diverge upwardly and outwardly toward the arch 11. Therefore, if the drag hitch assemblies were mounted in direct alignment with the vertical axes of the side walls, the shackle pins 29 would be angularly oriented with respect to each other. However, the drag hitch assemblies are mounted on the side walls—or more specifically, on the cheeks 12 and 13, respectively, so that they lie along vertical lines, with the result that the shackle pins 29 are parallel. This is advantageous, for such positioning tends to hold the shackles parallel and they operate or function most efficiently in such position. Figure 6 shows this arrangement most clearly and for purposes of emphasizing the same, broken lines 46 and 47 are provided—the lines 46 being drawn along the mean longitudinal axis of each cheek and lines 47 being drawn in true vertical planes, i. e., those lines represent the vertical axis of the hitch plates.

While in the foregoing specification an embodiment of the invention has been described in considerable detail for purposes of making a complete disclosure thereof, it will be apparent to those skilled in the art that numerous changes may be made in those details without departing from the spirit and principles of the invention.

I claim:

1. In an assembly of the character described, a hitch plate adapted to be rigidly secured to the cheek of a dragline bucket and having forwardly extending spaced apart legs, the uppermost leg thereof being provided in the upper surface thereof with a recess and having a riser wall extending thereabove, said riser wall being provided with a channel therein adjacent the upper end of said recess and being open along one side, a clevis having a pair of spaced apart legs interposed between the spaced legs of said hitch plate and at the forward end thereof being adapted to have a drag chain connected thereto, each of said legs having a bore therethrough and all of said bores being in axial alignment, a shackle pin extending through said bores and having an enlarged head seated within said recess, a retainer plate covering said head and having edge portions received within said channel, said retainer plate having a pair of apertures therethrough and said uppermost leg having a pair of grooves therein aligned with said apertures, and a nut and bolt assembly for each of said grooves and apertures with the nuts positioned within said grooves for preventing movement of said retainer plate through the open side of said channel.

2. The structure of claim 1 in which said retainer plate has a generally arcuate recess along the rear edge thereof enabling the same to be slid into said channel when said hitch plate is mounted upon the cheek of a dragline bucket.

3. The structure of claim 2 in which said retainer plate at the forward edge thereof is provided with a notch for receiving a tool for prying the plate from within said channel in disassembly of the structure.

4. A drag hitch assembly of the character described, comprising a hitch plate adapted to be rigidly secured to the cheek of a dragline bucket, said hitch plate providing a plurality of spaced legs having aligned bores extending therethrough, a clevis having spaced legs with aligned bores therethrough movably interposed between the legs of said hitch plate and with all of said bores in alignment, a shackle pin extending through said bores, means constraining said pin against axial movement in one direction, a retainer plate constraining movement of said pin in the other axial direction, the outer leg of said hitch plate having an open-ended channel therein communicating with said bore and slidably receiving said retainer plate, and means for preventing movement of said retainer plate outwardly through the open end of said channel, said last-mentioned means comprising at least one locking pin extending through said retainer plate, and a groove within the aforesaid outer leg receiving an end portion of said locking pin therein.

5. In a drag hitch assembly, a hitch plate and a clevis each having spaced-apart legs interpositioned with respect to each other and providing aligned bores therethrough, a shackle pin extending through said bores and being equipped with an enlarged head abutting the surface of the uppermost leg to prevent downward movement of the pin, said uppermost leg having a wall rising upwardly therefrom provided with a channel adjacent and above the head of said pin, a retaining plate slidably received within said channel in covering relation with said head, and means locking said retaining plate within said channel, said last-mentioned means comprising a locking pin extending through said retaining plate and being received within a groove provided in said uppermost leg.

References Cited in the file of this patent

UNITED STATES PATENTS

| | | |
|---|---|---|
| 483,221 | Hunt et al. | Sept. 27, 1892 |
| 1,114,239 | Downing | Oct. 20, 1914 |
| 2,501,429 | Yaun | Mar. 21, 1950 |
| 2,689,418 | Van Buskirk | Sept. 21, 1954 |

FOREIGN PATENTS

| | | |
|---|---|---|
| 497,446 | Canada | Nov. 3, 1953 |